(12) United States Patent
Srnec et al.

(10) Patent No.: US 11,022,451 B2
(45) Date of Patent: Jun. 1, 2021

(54) METHODS AND SYSTEMS FOR GENERATION AND UTILIZATION OF SUPPLEMENTAL STORED ENERGY FOR USE IN TRANSPORT CLIMATE CONTROL

(71) Applicant: THERMO KING CORPORATION, Minneapolis, MN (US)

(72) Inventors: Matthew Srnec, Minnetonka, MN (US); Wallace Hubbard, Minneapolis, MN (US); Michael James Vanous, Minneapolis, MN (US); Mark D. Leasure, Eagan, MN (US); Paul J. Kroes, Eden Prairie, MN (US); Philip Lavrich, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 218 days.

(21) Appl. No.: 16/178,067

(22) Filed: Nov. 1, 2018

(65) Prior Publication Data
US 2020/0141746 A1  May 7, 2020

(51) Int. Cl.
*G01C 21/34* (2006.01)
*B60H 1/00* (2006.01)
(Continued)

(52) U.S. Cl.
CPC ..... *G01C 21/3469* (2013.01); *B60H 1/00264* (2013.01); *B60H 1/00364* (2013.01);
(Continued)

(58) Field of Classification Search
CPC ............ G01C 21/3469; G01C 21/3415; G01C 21/3691; G01C 21/3697; B60H 1/00264;
(Continued)

(56) References Cited

U.S. PATENT DOCUMENTS

| 3,875,483 | A | 4/1975 | Farr |
| 5,104,037 | A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter conference, Seminar 36; Modeling and Control of the Personal Microenvironment, 5 pages.

(Continued)

*Primary Examiner* — Michael V Kerrigan
(74) *Attorney, Agent, or Firm* — Hamre, Schumann, Mueller & Larson, P.C.

(57) ABSTRACT

Methods and systems for operating a transport climate control system of a vehicle are provided. The method includes obtaining a state of charge of an energy storage device capable of providing power to the transport climate control system; determining an energy level including the state of charge, receiving a planned route for the vehicle, and receiving route status data associated with the planned route for the vehicle. The route status data includes traffic data, weather data, and/or geographic data identifying areas where the transport climate control system is to be solely powered by the energy storage device. The method further includes determining whether the energy level is sufficient to complete the planned route for the vehicle based on the planned route and the route data, and when the energy level is not sufficient to complete the planned route for the vehicle, providing a notification to a user via a display.

21 Claims, 6 Drawing Sheets

(51) Int. Cl.
*B60L 7/10* (2006.01)
*B60P 3/20* (2006.01)
*B60Q 9/00* (2006.01)
*B60R 16/033* (2006.01)
*G01C 21/36* (2006.01)
*H02J 7/00* (2006.01)
*H02J 7/14* (2006.01)

(52) U.S. Cl.
CPC .................. *B60L 7/10* (2013.01); *B60P 3/20* (2013.01); *B60Q 9/00* (2013.01); *B60R 16/033* (2013.01); *G01C 21/3415* (2013.01); *G01C 21/3691* (2013.01); *G01C 21/3697* (2013.01); *H02J 7/0047* (2013.01); *H02J 7/14* (2013.01); *B60Y 2300/91* (2013.01)

(58) Field of Classification Search
CPC ............ B60H 1/00364; B60H 1/00985; B60H 1/3232; B60H 1/00771; B60H 1/00428; B60H 1/3204; B60H 1/3222; B60L 7/10; B60P 3/20; B60Q 9/00; B60R 16/033; B60R 16/03; H02J 7/0047; H02J 7/14; B60Y 2300/91; Y02T 10/88
See application file for complete search history.

(56) References Cited

U.S. PATENT DOCUMENTS

| | | |
|---|---|---|
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,688,125 B2 | 2/2004 | Okamoto et al. |
| 6,753,692 B2 | 6/2004 | Toyomura et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabee |
| 8,476,872 B2 | 7/2013 | Truckenbrod et al. |
| 8,487,458 B2 | 7/2013 | Steele et al. |
| 8,541,905 B2 | 9/2013 | Brabee |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gieztold et al. |
| 8,670,225 B2 | 3/2014 | Nunes |
| 8,723,344 B1 | 5/2014 | Dierickx |
| 8,760,115 B2 | 6/2014 | Kinser et al. |
| 8,764,469 B2 | 7/2014 | Lamb |
| 8,818,588 B2 | 8/2014 | Ambrosio et al. |
| 8,862,356 B2 | 10/2014 | Miller |
| 8,924,057 B2 | 12/2014 | Kinser et al. |
| 8,978,798 B2 | 3/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabee |
| 9,147,335 B2 | 9/2015 | Raghunathan et al. |
| 9,199,543 B2 | 12/2015 | Brabee |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabee |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1 | 3/2019 | Thomas, Jr. |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2005/0057210 A1 | 3/2005 | Ueda et al. |
| 2006/0284601 A1 | 12/2006 | Salasoo et al. |
| 2007/0052241 A1 | 3/2007 | Pacy |
| 2007/0131408 A1 | 6/2007 | Zeigler et al. |
| 2007/0192116 A1 | 8/2007 | Lovitt |
| 2008/0023965 A1 | 1/2008 | Cagliari et al. |
| 2009/0121798 A1 | 5/2009 | Levinson |
| 2009/0126901 A1 | 5/2009 | Hegar et al. |
| 2009/0178424 A1 | 7/2009 | Hwang et al. |
| 2009/0229288 A1 | 9/2009 | Alston et al. |
| 2009/0314019 A1 | 12/2009 | Fujimoto et al. |
| 2009/0320515 A1 | 12/2009 | Bischofberger et al. |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0224841 A1 | 9/2011 | Profitt-Brown et al. |
| 2011/0241420 A1 | 10/2011 | Hering et al. |
| 2012/0000212 A1 | 1/2012 | Sanders et al. |
| 2012/0116931 A1 | 5/2012 | Meyers |
| 2012/0198866 A1 | 8/2012 | Zeidner |
| 2013/0000342 A1 | 1/2013 | Blasko et al. |
| 2013/0023180 A1 | 1/2013 | Park et al. |
| 2013/0088900 A1 | 4/2013 | Park |
| 2013/0158828 A1 | 6/2013 | McAlister |
| 2013/0197730 A1* | 8/2013 | Huntzicker ............... B60L 7/10 |
| | | 701/22 |
| 2013/0231808 A1 | 9/2013 | Flath et al. |
| 2014/0026599 A1 | 1/2014 | Rusignuolo et al. |
| 2014/0060097 A1* | 3/2014 | Perreault ............... B60H 1/3232 |
| | | 62/133 |
| 2014/0265560 A1 | 9/2014 | Leehey et al. |
| 2015/0081212 A1 | 3/2015 | Mitchell et al. |
| 2015/0188360 A1 | 7/2015 | Doane et al. |
| 2015/0231948 A1 | 8/2015 | Kennedy |
| 2015/0246593 A1 | 9/2015 | Larson et al. |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0280040 A1* | 9/2016 | Connell ............... G07C 5/008 |
| 2016/0285416 A1 | 9/2016 | Tiwari et al. |
| 2017/0030728 A1 | 2/2017 | Baglino et al. |
| 2017/0057323 A1 | 3/2017 | Neu et al. |

(56) References Cited

U.S. PATENT DOCUMENTS

| | | |
|---|---|---|
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0219374 A1* | 8/2017 | Sitarski .............. G01C 21/34 |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0029436 A1 | 2/2018 | Zaeri et al. |
| 2018/0029488 A1 | 2/2018 | Sjödin |
| 2018/0111441 A1 | 4/2018 | Menard et al. |
| 2018/0154723 A1 | 6/2018 | Anderson et al. |
| 2018/0170398 A1 | 6/2018 | Miller et al. |
| 2018/0201092 A1 | 7/2018 | Ahhuja et al. |
| 2018/0203443 A1 | 7/2018 | Newman |
| 2018/0222278 A1 | 8/2018 | Mizuma |
| 2018/0238698 A1* | 8/2018 | Pedersen ............ G01C 21/3492 |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0092122 A1 | 3/2019 | Vanous et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2020/0086712 A1 | 3/2020 | Schumacher et al. |
| 2020/0086744 A1 | 3/2020 | Schumacher et al. |
| 2020/0101818 A1 | 4/2020 | Holmstrom et al. |
| 2020/0101820 A1 | 4/2020 | Wenger et al. |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 3343728 | 7/2018 |
| EP | 3536552 | 9/2019 |
| EP | 3540340 | 9/2019 |
| GB | 2551999 | 1/2018 |
| JP | 2000-158930 | 6/2000 |
| JP | 2007-320352 | 12/2007 |
| JP | 2009-243780 | 10/2009 |
| JP | 2019-145521 | 8/2019 |
| KR | 10-2012-0092834 | 8/2012 |
| WO | 03038988 | 5/2003 |
| WO | 2010065476 | 6/2010 |
| WO | 2011066468 | 6/2011 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016145107 | 9/2016 |
| WO | 2017058660 | 4/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018005957 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/235,865, titled "Methods and Systems for Preserving Autonomous Operation of a Transport Climate Control System", filed Dec. 28, 2018, 35 pages.

U.S. Appl. No. 16/565,063, titled "System and Method for Managing Power and Efficiently Sourcing a Variable Voltage for a Transport Climate Control System ", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/176,720, titled "Methods and Systems for Augmenting a Vehicle Powered Transport Climate Control System", filed Oct. 31, 2018, 33 pages.

U.S. Appl. No. 16/176,667, titled "Drive Off Protection System and Method for Preventing Drive Off", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/147,708, titled "Methods and Systems for Autonomous Climate Control Optimization of a Transport Vehicle", filed Sep. 29, 2018, 41 pages.

(56) References Cited

OTHER PUBLICATIONS

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US20181068142, titled "Methods and Systems for Providing Predictive Energy Consumption Feedback for Powering a Transport Climate Control System Using External Data", filed Dec. 31, 2018, 39 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/565,110, titled "Transport Climate Control System With a Self-Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution to Transport Climate Control Systems Amongst One or More Electric Supply Equipment Stations ", filed Sep. 9, 2019, 41 pages.

European Patent Application No. 19382776.3, titled "Mprioritized Power Delivery for Facilitating Transport Climate Control", filed Sep. 9, 2019, 41 pages.

U.S. Appl. No. 16/565,205, titled "Transport Climate Control System With an Accessory Power Distribution Unit for Managing Transport Climate Control Loads", filed Sep. 9, 2019, 54 pages.

U.S. Appl. No. 16/565,235, titled "Interface System for Connecting a Vehicle and a Transport Climate Control System", filed Sep. 9, 2019, 64 pages.

U.S. Appl. No. 16/565,252, titled "Demand-Side Power Distribution Management for a Plurality of Transport Climate Control Systems", filed Sep. 9, 2019, 44 pages.

U.S. Appl. No. 16/565,282, titled "Optimized Power Cord for Transferring Power to a Transport Climate Control System", filed Sep. 9, 2019, 43 pages.

Extended European Search Report, issued in the corresponding European patent application No. 19205699.2, dated Mar. 30, 2020, 5 pages.

\* cited by examiner

METHODS AND SYSTEMS FOR GENERATION AND UTILIZATION OF SUPPLEMENTAL STORED ENERGY FOR USE IN TRANSPORT CLIMATE CONTROL

FIELD

This disclosure is directed to systems and methods for predicting the energy consumption of a transport climate control system, comparing it to the stored and predicted energy available to the transport climate control system, and determining and notifying a user regarding the ability of the transport climate control system to complete a route.

BACKGROUND

A transport climate control system can include, for example, a transport refrigeration system (TRS). A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.).

SUMMARY

This disclosure is directed to systems and methods for predicting the energy consumption of a transport climate control system, comparing it to the stored and predicted energy available to the transport climate control system, and determining and notifying a user regarding the ability of the transport climate control system to complete a route.

By measuring energy levels while a vehicle is in transit and determining whether the energy level will satisfy the predicted energy costs of a route based on the route and ambient conditions, it can be determined whether a transport climate control system can be powered by the energy storage to complete the route, and remedial actions such as abandoning or altering the route or modifying the set point conditions of the transport climate control system may be taken to complete the route or preserve the goods. Further, this allows unexpected changes in conditions during transit, such as traffic, to be accounted for and responded to in real time. Embodiments may further provide users with alternate routes or the option to change the set point of the transport climate control system to allow a route to be completed. This allows the transport climate control system to be successfully used even when routes and conditions such as traffic, ambient temperature, and solar intensity are subject to significant changes. Further, embodiments allow users to react to those changes in transit, even when the conditions cannot be predicted prior to the vehicle starting a route. Embodiments also facilitate compliance with environmental regulations which may restrict the use of combustion engines and such prime movers that may be used to power transport climate control systems.

In an embodiment, a method of operating a transport climate control system of a vehicle includes obtaining a state of charge of an energy storage device capable of providing power to the transport climate control system while the vehicle is in transit and determining an energy level including the state of charge. The method further includes receiving a planned route for the vehicle and receiving route status data associated with the planned route for the vehicle, wherein the route status data comprises at least one of traffic data, weather data, and geographic data identifying areas where the transport climate control system is to be solely powered by the energy storage device. The method then includes determining, using a processor, whether the energy level is sufficient to complete the planned route for the vehicle based on the planned route and the route data. When the energy level is not sufficient to complete the planned route for the vehicle, the method includes providing a notification to a user via a display.

In an embodiment, the planned route includes at least one segment where the transport climate control system is powered by a prime mover and at least one segment where the transport climate control system is powered solely by the energy storage device.

In an embodiment, the energy storage device is a battery of the transport climate control system. In an embodiment, the energy storage device is a battery of the vehicle.

In an embodiment, the energy level further includes a predicted quantity of harvested energy. In an embodiment, the predicted quantity of harvested energy is predicted based on the route status data. In an embodiment, the harvested energy includes energy from solar collection. In an embodiment, the harvested energy includes energy from regenerative braking.

In an embodiment, the display is located on the vehicle. In an embodiment, the display is separate from the vehicle.

In an embodiment, the method further includes determining a predicted run time for the transport climate control system based on the energy level, the planned route, and the route data, and presenting the predicted run time to the user via the display.

In an embodiment, the method further includes determining, using the processor, an alternate route based on map data, the energy level, and the route status data, and wherein the notification includes the alternate route.

In an embodiment, the method further includes determining, using the processor, adjusted set point parameters for the transport climate control system that are capable of completing the planned route for the vehicle based on cargo data for the vehicle, the planned route, the route status data, and the energy level, and wherein the notification includes the adjusted set point parameters. In an embodiment, the method further includes receiving a user input accepting or rejecting the adjusted set point parameters, and when a user input accepting the adjusted set point parameters is received, operating the transport climate control system according to the adjusted set point parameters.

In an embodiment, a transport climate control system includes a refrigeration circuit including a compressor powered by an energy storage device, a power meter measuring a state of charge of the energy storage device, a display, and a processor. The processor is configured to receive an energy level including the state of charge of the energy storage device, a planned route, and route status data. The route status date includes at least one of traffic data, weather data, and geographic data identifying areas where the transport climate control system is to be solely powered by the energy storage device. The processor is configured to determine whether the energy level is sufficient to complete the planned route for the vehicle based on the planned route and the route data; and direct the display to provide a notification when the energy level is not sufficient to complete the planned route for the vehicle.

In an embodiment, the transport climate control system further includes a prime mover configured to drive an alternator, the alternator charging the energy storage device.

In an embodiment, the transport climate control system further includes a power harvesting device. The power harvesting device may be a solar cell or a regenerative braking device. The processor is configured to determine a predicted quantity of power harvested by the power harvesting device and include the predicted quantity of power harvested in the energy level.

In an embodiment, the processor is configured to determine an alternate route based on map data, the energy level, and the route status data, and the notification includes the alternate route. In an embodiment, the processor is configured to determine adjusted set point parameters for the transport climate control system that are capable of completing the planned route for the vehicle based on cargo data for the vehicle, the planned route, the route status data, and the energy level, and the notification includes the adjusted set point parameters. In an embodiment, the transport climate control system further includes a user input device configured to receive an input accepting or rejecting the adjusted set point parameters, and the transport climate control system is operated according to the adjusted set point parameters when the input accepting the adjusted set point parameters is received.

DRAWINGS

DETAILED DESCRIPTION

This disclosure is directed to systems and methods for predicting the energy consumption of a transport climate control system, comparing it to the stored and predicted energy available to the transport climate control system, and determining and notifying a user regarding the ability of the transport climate control system to complete a route.

Figure 1:
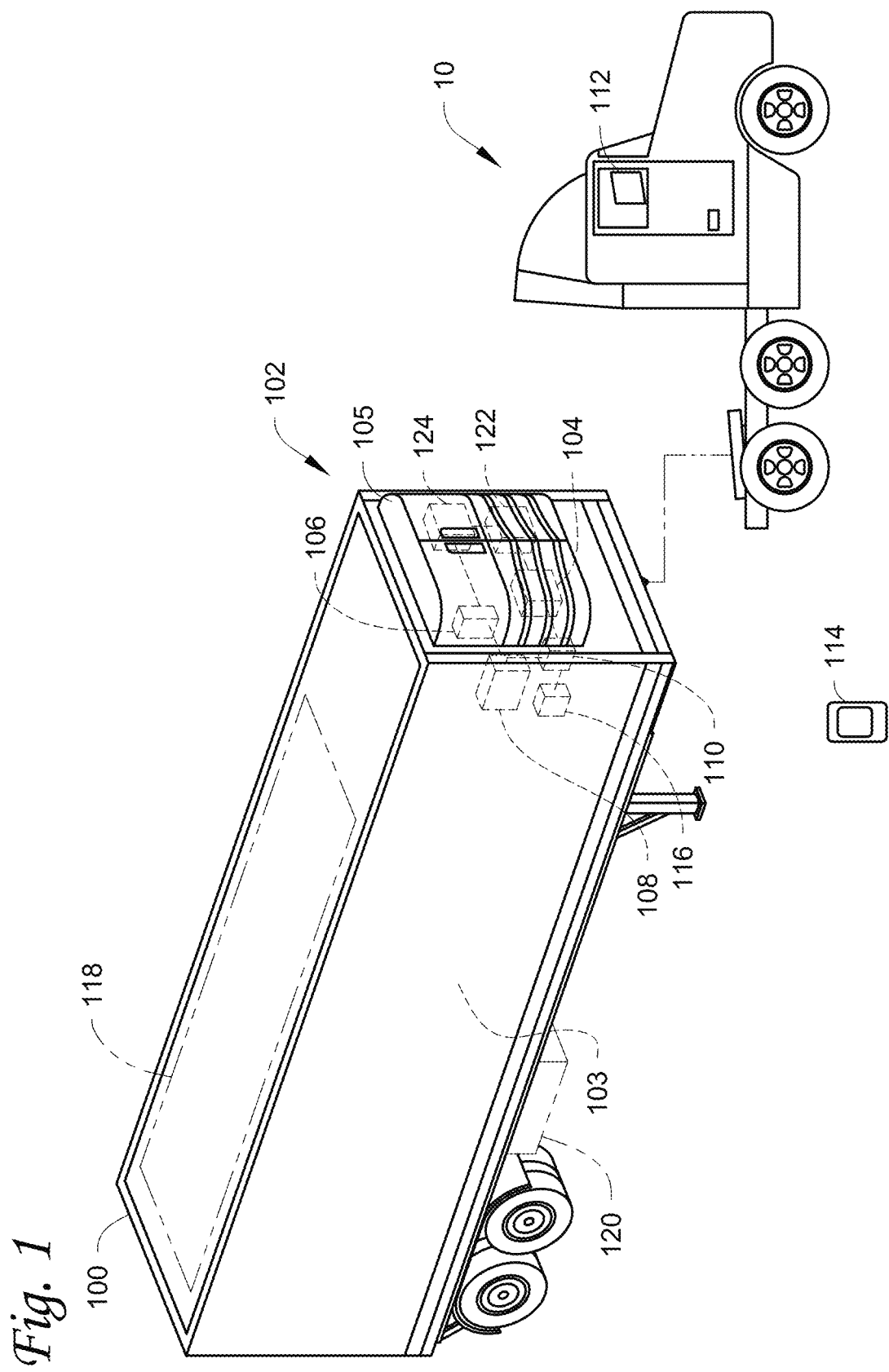
FIG. 1 shows a vehicle including a transport climate control system according to an embodiment.

FIG. 1 shows a system diagram of a vehicle 10 according to an embodiment, including a transport unit 100 that includes transport climate control system 102. The transport climate control system 102 includes a transport refrigeration unit (TRU) 105 mounted to a front wall of the transport unit 100. The TRU 105 includes a refrigeration circuit including compressor 104. The transport unit 100 also includes an energy storage device 106, a power meter 108, a processor 110, and may include a display 112. In an embodiment, the system on vehicle 100 is in communication with a remote device 114 via a communications link 116. In this embodiment, the transport unit 100 optionally includes solar panels 118 and/or regenerative braking energy harvester 120. The TRU 105 includes a prime mover 122 and an alternator 124 coupled to the prime mover 122.

The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination. In some embodiments, the vehicle 10 can be, for example, a straight truck, van, bus, train, etc. Transport unit 100 is a transport unit (e.g., a truck, a container (such as a container on a flat car, an intermodal container, etc.), a box car, a semi-tractor, a bus, or other similar transport unit). The goods transported in an internal space (e.g., cargo space) 103 of the transport unit 100 may be climate-sensitive goods such as perishable goods including food, pharmaceuticals, or other such goods. In some embodiments, the internal space 103 may include multiple zones each of which achieving a different climate that controlled by the transport climate control system 102.

The transport climate control system 102 provides climate control (e.g., temperature, humidity, air quality, and the like) to the internal space 103 of the transport unit 100. Along with the TRU 105, the transport climate control system 102 can include one or more remote evaporator units in the internal space 103, sensors, etc. The TRU 105 houses at least a portion of the main refrigeration circuit (including the compressor 104, evaporator, condenser, expansion device, etc.) (not shown) and fans/blowers (not shown) and also houses the processor 110, the prime mover 122, the energy storage device 106, etc.

The refrigeration circuit of the climate control system 102 may also include one or more remote evaporator units in the internal space 103 the transport unit 100 that are climate controlled. The one or more remote evaporator units may have one or more remote evaporator fans circulating air into the internal space 103. The remote evaporator fans may be electrically powered, for example by power supplied by energy storage device 106 or prime mover 122.

Compressor 104 may be an electrically powered compressor, powered by energy storage device 106 and optionally further capable of receiving power from alternator 124 connected to prime mover 122 or from a vehicle power source. Compressor 104 may be a hybrid compressor, powered by energy storage device 106 and a mechanical connection to prime mover 122.

Energy storage device 106 stores electrical energy to power compressor 104. Energy storage device 106 may include one or more batteries. The one or more batteries included in the energy storage device 106 may be a rechargeable battery. The one or more batteries included in energy storage device 106 may be, for example, lead-acid batteries, lithium-ion batteries, etc. Energy storage device 106 has a finite storage capacity. As shown in FIG. 1, the energy storage device 106 may be included in the TRU 105. In other embodiments, the energy storage device 106 may be included on or in the transport unit 100. In other embodiments, the energy storage device 106 is a main battery of an engine of vehicle 10, or an auxiliary battery mounted on vehicle 10.

Power meter 108 measures the state of charge of energy storage device 106. Power meter 108 may include a sensor measuring a parameter reflective of a state of charge of energy storage device 106, such as a voltage sensor, a current sensor, etc. In an embodiment, power meter 108 can include multiple sensors that measure the state of charge of energy storage device 106 (e.g., a current sensor measuring current flow from the energy storage device 106 and a voltage sensor measuring a voltage provided by the energy storage device 106). In an embodiment, power meter 108 measures the state of charge of energy storage device 106 by engaging the energy storage device 106 to a load for a predetermined amount of time and measuring the changes in current and/or voltage based on engagement to and/or removal from that load.

Prime mover 122 may be an internal combustion engine, such as a gasoline or diesel engine. In some embodiments, prime mover 122 can directly drive operation of compressor 104 at least a portion of the time when the transport climate control system 102 is in use.

Prime mover 122 is coupled to the alternator 124 that converts the mechanical power from prime mover 122 into electrical power. In some embodiments, prime mover 122 can supply power to compressor 104 via alternator 124.

Processor 110 is located within the TRU 105. In other embodiments, the processor 110 can be provided in or on vehicle 10 or transport unit 100 and in communication with the power meter 108 and communications link 116. Processor 110 receives a planned route for the vehicle and route status data. The planned route and/or the route status data may be received via communication link 116.

The planned route defines a route to be taken by the vehicle 10. The planned route may include a number of stops. The planned route may include a sequence of the stops. The planned route may include routing over roads between each of the stops. The planned route may be determined prior to the vehicle 10 departing for the trip.

The route status data is data regarding the conditions affecting the route. The route status data may include, for example, weather data (such as ambient temperatures, precipitation, cloud cover and/or solar intensity, and the like, and forecasts for those). The route status data may include, for example, traffic data indicating the location of traffic and estimated delays due to such traffic. The traffic data may be data such as average traffic levels, current traffic updates and alerts, or the like. The route status data may include geographic data indicating characteristics of the geographic areas, such as constraints on emissions that may affect the ability to operate the prime mover 122. The route status data may include road availability information, such as, for example, road closures, detours, etc. In an embodiment, the route status data identifies areas where the transport climate control system 102 can be solely powered by the energy storage device 106.

The processor 110 is configured to determine, based on the planned route and the route status data, whether an energy level including the state of charge of the energy storage device 106 is sufficient to complete the planned route. The energy level may further include charging provided by alternator 124 when prime mover 122 is operated. In an embodiment, the energy level further includes power harvested by solar cells 118 and/or regenerative braking energy harvester 120. In an embodiment, when the energy level is not sufficient to complete the planned route, processor 110 sends a notification to display 112 and/or remote device 114.

Display 112 is a display provided in the vehicle 10. The display 112 may be located within a cabin of vehicle 10, for example in proximity to and viewable from the driver's seat of vehicle 10. In an embodiment, display 112 can be a touch screen or have a user input device allowing user input.

Remote device 114 is a computing device separate from vehicle 10 or transport unit 100. In an embodiment, remote device 114 is a remote server. In an embodiment, the remote device 114 can be a mobile device of the driver. Remote device 114 can provide the planned route and/or the route status data to processor 110 via communications link 116. Remote device 114 may further receive notifications generated by processor 110 in place of or in addition to display 112. Remote device 114 may include a user input device such as a touchscreen, mouse, keyboard, or the like allowing user input, for example, in response to a notification generated by processor 110. In an embodiment, remote device 114 is a server of a routing, fleet management, or telematics system. In an embodiment, remote device 114 is a mobile device such as a cellular phone or tablet. In an embodiment where remote device 114 is a mobile device such as a cellular phone or tablet, it may obtain the planned route and/or route status data from a server of a routing, fleet management, or telematics system.

Communications link 116 is a communications link allowing the vehicle to communicate with remote device 114 while the vehicle is in transit. Communications link 116 may be, for example, a cellular antenna. In an embodiment, remote device 114 is a user's mobile device such as a mobile phone and communications link 116 is a BLUETOOTH™, near-field communications, or other such short-range communications antenna. In an embodiment where remote device 114 is a user's mobile device and the communications link 116 is a short-range communications antenna, the remote device 114 may use a cellular data connection to obtain the planned route and/or the route status data and provide it to processor 110.

Solar panels 118 may optionally be located on vehicle 10 or transport unit 100, for example, on the top of a trailer. Solar panels 118 receive solar energy and convert it to electrical energy. Solar panels 118 may be connected to energy storage device 106 and used to provide power to charge and/or supplement energy storage device 106.

Regenerative braking energy harvester 120 may optionally be included in vehicle 10 or transport unit 100. Regenerative braking energy harvester may be, for example, an axle-mounted energy harvester attached to the vehicle 10 or transport unit 100. Regenerative braking energy harvester 120 captures mechanical energy and converts it to electrical energy. Regenerative braking energy harvester 120 may be connected to energy storage device 106 and used to provide power to charge and/or supplement energy storage device 106.

Figure 2:
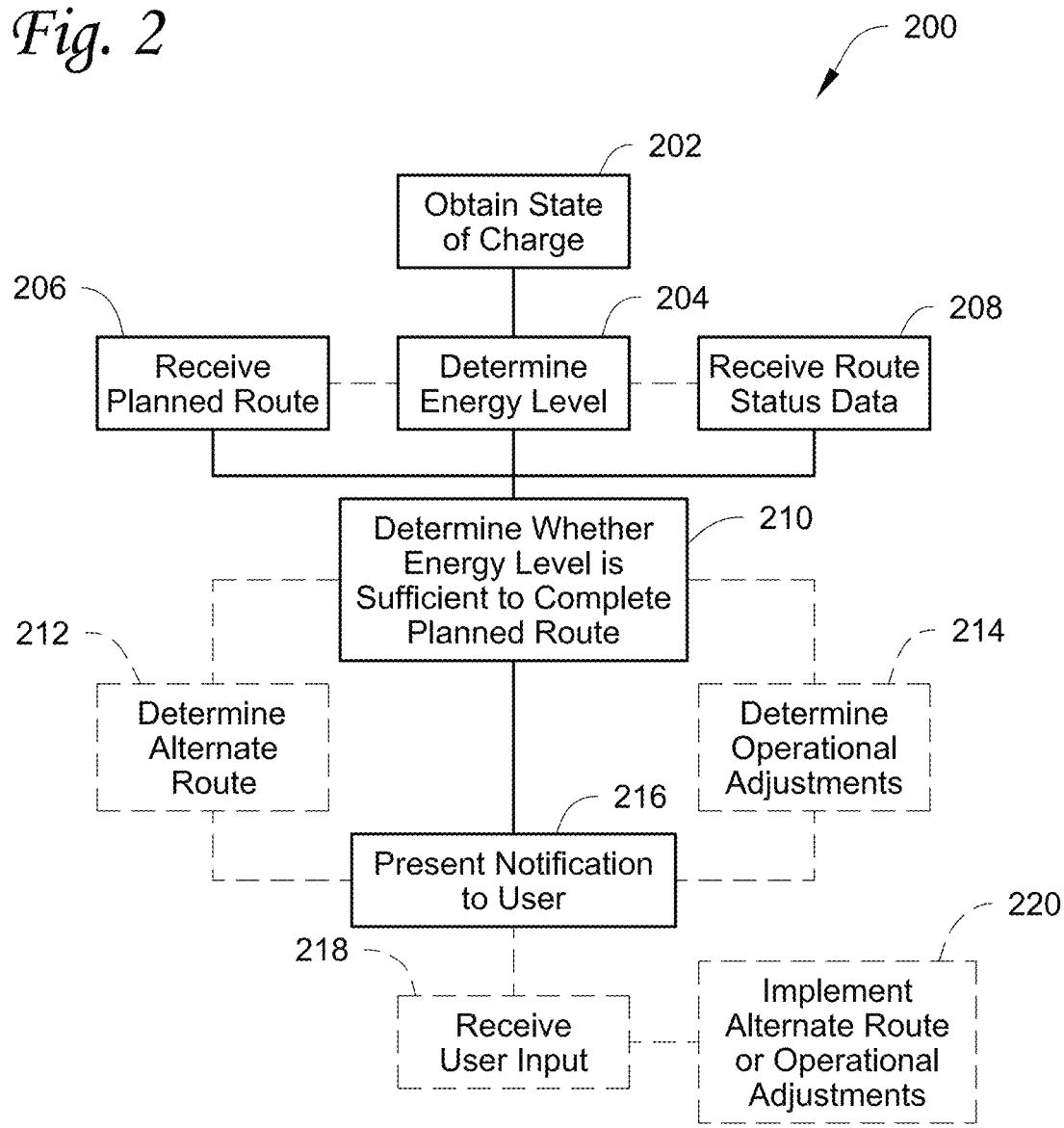
FIG. 2 shows a flowchart of an embodiment of a method for operating the transport climate control system shown in FIG. 1.

FIG. 2 shows a flowchart of a method 200 of operating the transport climate control system 102 shown in FIG. 1, according to an embodiment.

The method begins at 202, whereby a state of charge for energy storage device 106 is obtained using power meter 108, coupled to energy storage device 106. The state of charge is obtained while vehicle 10 and transport unit 100 are in transit and transport climate control system 102 is in operation. The state of charge may be obtained by power meter 108 through, for example, measurement of voltages and current, measurement of changes in voltage and current based on loading, or the like. The method then proceeds to 204.

At 204, an energy level is determined by processor 110 based on the state of charge obtained at 202 by power meter 108. In some embodiments, the energy level is the state of charge. In some embodiments, the energy level further includes energy provided to the system by one or more energy harvesting devices. The energy harvesting devices may be, for example, solar panels 118 and/or regenerative braking device 120. In an embodiment, the energy output of the energy harvesting devices is predicted based on planned route and/or the route status data received by processor 110 at 206 and 208, respectively. For example, where the energy harvesting device is a regenerative braking device, the route data may be used to predict the amount of energy recovered. In an embodiment, traffic data may further be used to predict the harvested energy. In an embodiment where the energy harvesting device is a solar panel, route status data such as weather data including solar intensity data or cloud cover data, may be used to predict the harvested energy. The planned route may further be used to determine the time and location in combination with the weather data to determine a predicted energy value. The predicted energy value from the energy harvesting devices may be included in the energy level determined at 204.

Figure 3:
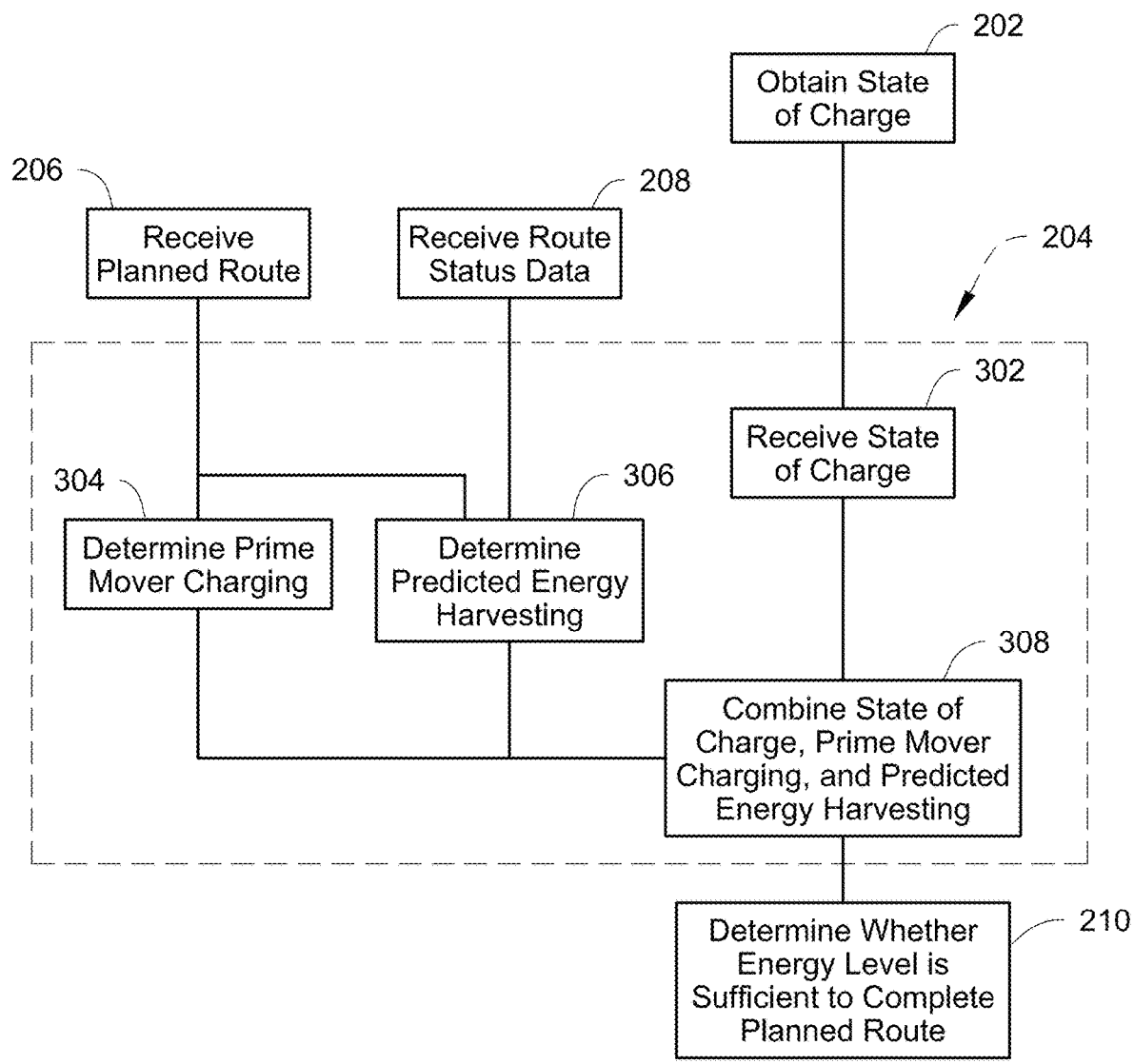
FIG. 3 shows a flowchart of a method of determining an energy level of a transport climate control system according to an embodiment.

An example embodiment of determining the energy level 204 is shown in FIG. 3 and described in detail below.

In some embodiments, the energy level further includes predicted charging by alternator 124 coupled to the energy storage device 106. The predicted charging by the alternator 124 may be based on the planned route, for example a predicted time or distance during which prime mover 122 can be operated before the route enters an emissions-restricted zone and the transport climate control system 102 must be operated without using prime mover 122.

At 206, processor 110 receives a planned route. The planned route may be received from the remote device 114 via communication link 116. The planned route defines a route to be taken by the vehicle. The planned route may include a number of stops. The planned route may include a sequence of the stops. The planned route may include routing over roads between each of the stops. The planned route may be determined prior to the vehicle departing for the trip.

At 208, the processor 110 receives route status data. The route status may be received from the remote device 114 via communication link 116. The route status data is data regarding the conditions affecting the route. The route status data may include, for example, weather data, such as ambient temperatures, precipitation, cloud cover and/or solar intensity, and the like, and forecasts for those. The route status data may include, for example, traffic data indicating the location of traffic and estimated delays due to such traffic. The traffic data may be data such as average traffic levels, current traffic updates and alerts, or the like. The route status data may include geographic data indicating characteristics of the geographic areas, such as constraints on emissions that may affect the ability to operate a prime mover 122. In an embodiment, the route status data identifies areas where the transport climate control system 102 is to be solely powered by the energy storage device 106.

Once the processor 110 determines the energy level at 204, receives the planned route at 206, and receives the route status data at 208, the method 200 proceeds to 210.

Figure 4:
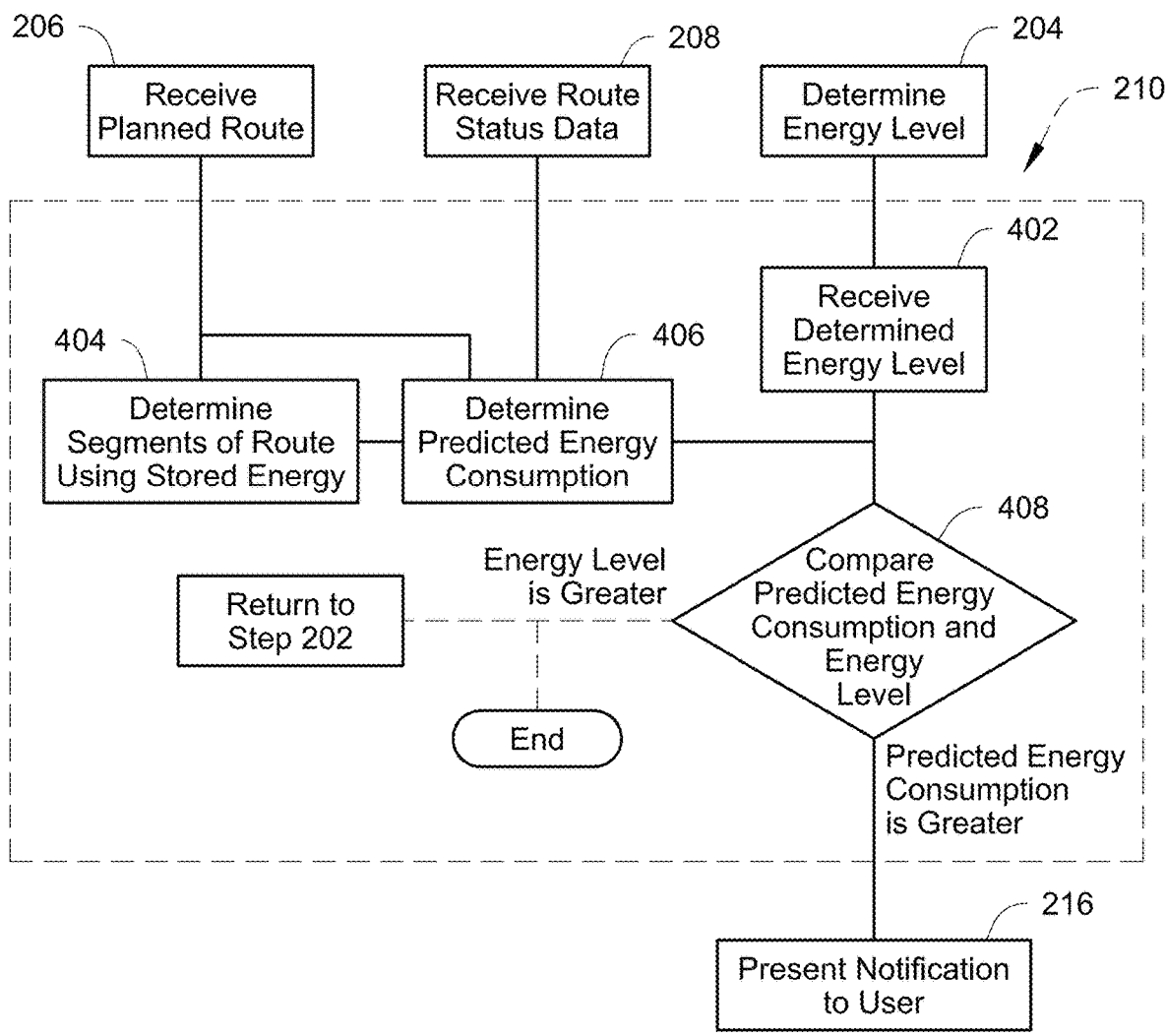
FIG. 4 shows a flowchart of a method of determining whether an energy level of a transport climate control system is sufficient to complete a route according to an embodiment.

At 210, the method 200 determines whether the energy level is sufficient to complete the planned route. Processor 110 can generate a prediction of the energy consumption of transport climate control system 102 over the planned route received at 206, based on the route status data received at 208. Processor 110 can further compare the prediction of the energy consumption to the energy level determined at 204. When the predicted energy consumption exceeds the energy level, the processor 110 can determine that the energy level is insufficient to complete the planned route. When the energy level exceeds the predicted energy consumption, the processor 110 can determine that the energy level is sufficient to complete the planned route. An example embodiment of 210, where the processor 110 determines whether the energy level is sufficient to complete the planned route, is shown in FIG. 4 and described in detail below. The method 200 then proceeds to 216. In some embodiments, the method 200 can also optionally proceed to 212 and 214.

Figure 5:
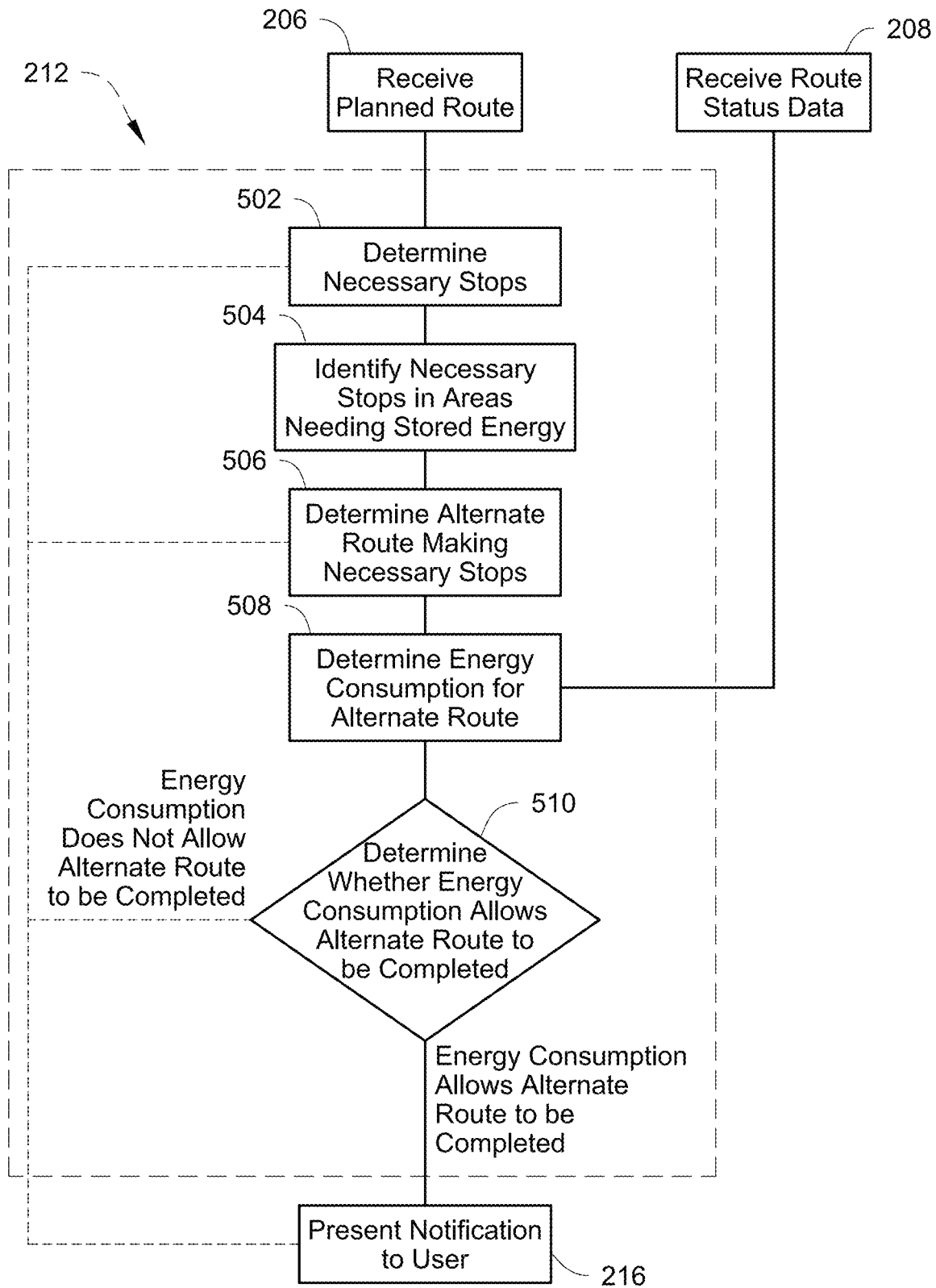
FIG. 5 shows a flowchart of a method of determining an alternate route for a vehicle that allows an energy level of a transport climate control system to complete the alternate route according to an embodiment.

Optionally, at 212, an alternate route is determined using processor 110. The alternate route is a route different from the planned route. In an embodiment, the alternate route includes all stops from the planned route. In an embodiment, the alternate route includes fewer stops than the planned route. In an embodiment, the alternate route increases the amount of time spent outside an area where the transport climate control system is to be solely powered by the energy storage device 106, for example to allow a prime mover 122 to charge the energy storage device 106 via alternator 124. In an embodiment, alternate route alternates stops within and outside the area where the transport climate control system 102 is to be solely powered by the energy storage device 106. In an embodiment, the determination of the alternate route includes selecting stops to skip based on a prioritization ranking for each of the stops. The prioritization ranking may be based on the frequency of deliveries to that customer, the cargo being delivered to that customer, previous skipping of that customer, etc. An example embodiment of 212 providing a method for processor 110 to determine an alternate route is shown in FIG. 5 and described in detail below. The method 200 then proceeds to 216.

Figure 6:
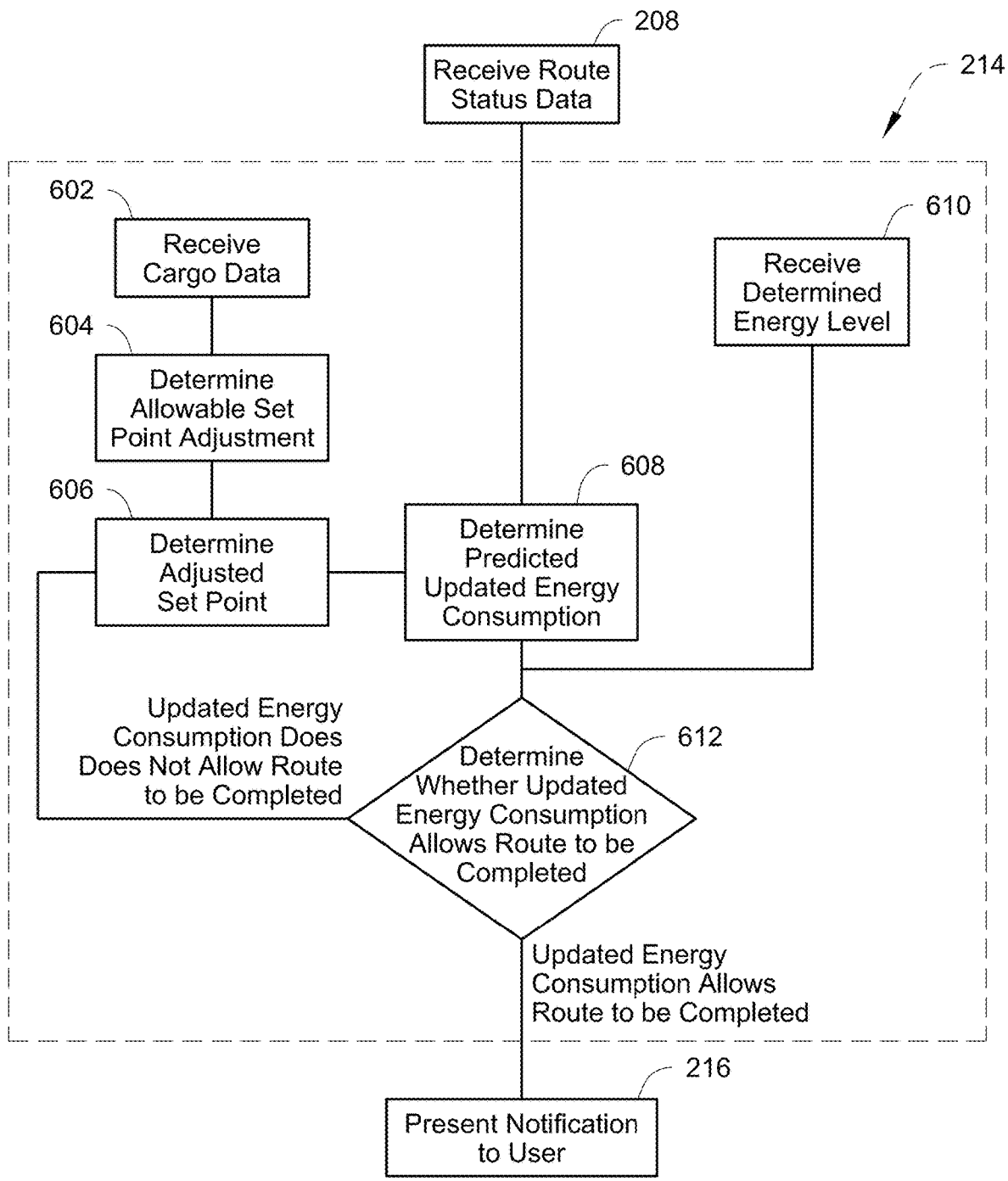
FIG. 6 shows a flowchart of a method of determining operational adjustments to operation of a transport climate control system allowing an energy level of a transport climate control system to complete a planned route according to an embodiment.

Optionally, at 214, operational adjustments are determined using processor 110. The operational adjustments determined by processor 110 are changes to the operation of the transport climate control system affecting the rate of power consumption by the transport climate control system. For example, the operational adjustments may be adjustments to the set points that control the operation of the compressor and the evaporator fans of the transport climate control system. In an embodiment, the operational adjustments may be changes to compressor speed and/or compressor operating capacity when used with the transport climate control system. An example embodiment of 214 providing a method for processor 110 to determine operational adjustments is shown in FIG. 6 and described in detail below. The method 200 then proceeds to 216.

At 216, processor 110 directs display 112 or remote device 114 to present a notification to the user. When it is determined at 210 that the energy level is insufficient to complete the planned route, the notification may be a notice that the energy level is insufficient to complete the planned route. The notification may be an indication of a predicted runtime or distance that can be successfully completed based on the energy level. The notification may optionally include an alternate route determined in 212 or operational adjustments determined in 214. In an embodiment, the notification includes a prompt for the user to accept the alternate route or the operational adjustments. In some embodiments, the method 200 can then optionally proceed to 218.

Optionally, at 218 a user input is received at, for example, display 112 or remote device 114. The user input may be entered via, for example, a touchscreen, a keyboard, a microphone or the like. The user input may include an acceptance or rejection of an alternate route or operational adjustments, for example as a response to a prompt included in the notification provided at 216. The method 200 then optionally proceeds to 220.

Optionally, at 220, the alternate route determined by processor 110 at 212 and/or operational adjustments determined by processor 110 at 214 are implemented. Where an alternate route is determined by processor 110 and accepted via user input at display 112 or remote device 114, the alternate route can be presented to the driver of vehicle 10, for example, via display 112 or remote device 114 or via another routing device accessible to the driver of vehicle 10, such as a fleet management system, a mobile device, an on-board navigation device, or the like. Where operational adjustments are determined via processor 110 and accepted via user input at display 112 or remote device 114, the operational adjustments can be implemented via processor 110 or another controller of transport climate control system 102 adopting the operational adjustments such as variations to the set point temperatures of the transport climate control system 102, and operating transport climate control system 102 in accordance with the operational adjustment(s).

FIG. 3 shows a flowchart of a method 300 of determining an energy level at 204, according to an embodiment. In the embodiment shown in FIG. 3, determining the energy level at 204 includes receiving the state of charge at 302, determining prime mover charging 304, determining predicted energy harvesting 306, and combining the state of charge, prime mover charging, and predicted energy harvesting 308. The value determined by combining the state of charge, prime mover charging, and predicted energy harvesting 308 may then be used in determining whether the energy level is sufficient to complete the planned route 210, as shown in FIGS. 2 and 4.

At 302, the state of charge is received by processor 110. The state of charge obtained at 202 is provided to the processor 110 from the power meter 108.

At 304, predicted charging provided by the prime mover 122 and alternator 124 is determined. The predicted charging provided by prime mover 122 and alternator 124 may be determined based in part on the planned route received at 206, and optionally the route status data received at 208. The predicted charging may be determined based on an estimate of the charging of the energy storage unit 106 by the alternator 124 powered by prime mover 122. In particular, the predicted charging can be based on, for example, the efficiency of alternator 124, the predicted time prime mover 122 will be operated during the planned route, the consumption of energy by transport climate control system 102 during operation of prime mover 122, and the like.

At 306, processor 110 determines the overall predicted energy harvesting for all of the energy harvesting components included on vehicle 10 and transport unit 100, such as solar panels 118 and regenerative braking energy harvester 118. The overall predicted energy harvesting is determined by determining expected amount of energy harvested is determined for each energy harvesting device included on the vehicle and combining those values. For example, in an embodiment where the energy harvesting devices of the vehicle include solar panels, the route status data including weather data and the planned route are used to provide solar intensity over time, or time under different levels of cloud cover. A function defining the efficiency and/or output of the solar panels may then be used to determine a predicted solar energy. In an embodiment where the energy harvesting devices include regenerative braking energy harvesters, the length of the route, determined from the planned route, may be combined with traffic data or geographic data such as elevation changes, speed limits, etc. from the route status data to determine planned acceleration and deceleration during the planned route, and these used to determine the amount of energy likely to be harvested by regenerative braking. These values may be combined for vehicles including multiple energy harvesting devices. In an embodiment, previous trip data may be used to predict energy harvesting. For example, an average energy harvesting over a number of previous trips along the same route as the predicted route may be used as the value for predicted energy harvesting. In an embodiment, the previous trip data corresponding to the planned route and the energy harvesting data for that previous trip data may be obtained via remote device 114 and data storage and processing outside of vehicle 10.

Once the state of charge is determined at 302, the predicted charging is determined at 304 and the predicted energy harvesting is determined at 306, the method 300 proceeds to 308.

At 308, the state of charge, predicted charging, and predicted energy harvesting are combined to determine the overall energy level. The overall energy level determined by processor 110 via the method 300 can include the state of charge of the energy storage device 106 and predicted values for additional energy that may be provided over the route by a prime mover and energy harvesting devices such as solar panels, regenerative braking devices, or the like. The combined value may then continue through the method 200 shown in FIG. 2, to be used in determining whether the energy level is sufficient to complete the planned route at 210.

FIG. 4 shows a flowchart of a method 400 of determining whether an energy level is sufficient to complete a route at 210, according to an embodiment. In an embodiment, determining whether an energy level is sufficient to complete a route includes receiving the determined energy level 402, determining segments of the route using stored energy 404, determining predicted energy consumption 406, and comparing the predicted energy consumption to the energy level 408. Where the energy level is greater than the predicted energy consumption, the method 200, 400 may end or continue iterating by returning to obtaining the state of charge at 202 as shown in FIG. 2 and described above. Where the predicted energy consumption is greater than the energy level, a notification may be presented to the user 216 as that is shown in FIG. 2 and described above.

The determined energy level is received by processor 110 at 402. The determined energy level is the energy level determined by processor 110 at 204, based on data received from power meter 108, for example according to the embodiment shown in FIG. 3. The energy level determined by processor 110 at 204 may be stored in a memory and then retrieved from that memory by processor 110 at 402.

At 404, the processor 110 determines the segments of the planned route using stored energy. The planned route received by processor 110 at 206 can be compared to geographic data included in the route status data received by processor 110 at 208. The segments of the route falling within regions where the energy storage device 106 must be used to operate the transport climate control system 102 can be identified by the processor 110 by comparing the planned route to the geographic data.

At 406, processor 110 determines the predicted energy consumption for the planned route. The predicted energy consumption can be determined based on the planned route and the route status data received by processor 110 at 206 and 208, respectively. In particular, the predicted energy consumption may be determined by using the planned route and the route status data to determine the location and duration of when the transport climate control system 102 is powered by the energy storage device 106. The route status data may further be used to provide information on ambient conditions during the planned route. The ambient conditions may include, for example, ambient temperature and cloud cover or solar intensity where the transport climate control system 102 is located. The ambient conditions corresponding to the time and location of the transport climate control system 102 when it is being powered solely by the energy storage device 106 may be used to determine the energy consumption of the transport climate control system 102 during the planned route. The energy consumption may be determined based on a model, such as a function, simulation data, or a predetermined lookup table for energy consumption over time by the transport climate control system 102 based on ambient conditions. In an embodiment using such a mode, the total energy consumption can be an integral over time of the energy consumption based on the ambient conditions at particular points in time.

Once the determined energy level is received at 402, the segments of the planned route using stored energy is determined at 404 and the predicted energy consumption is determined at 406, the method 400 proceeds to 408.

At 408, the processor 110 compares the predicted energy consumption to the energy level. The value obtained in determining the predicted energy consumption at 406 is compared to the energy level received by processor 110. In an embodiment, when the energy level is greater than the predicted energy consumption, the method 200, 400 can end. In an embodiment, when the energy level is greater than the predicted energy consumption, the method 200 shown in FIG. 2 is iterated by returning to 202 where the state of charge of the energy storage device 106 is obtained by power meter 108. In an embodiment, the iterations may be periodic, for example by introducing a delay period between the comparison of predicted energy consumption and energy level by processor 110 at 408 and the return to using the power meter 108 to obtain the state of charge of the energy storage device 106 at 202. When the predicted energy consumption is greater than the energy level, the method 200 shown in FIG. 2 continues by presenting a notification to the user via display 112 or remote device 114 at 216.

FIG. 5 shows a flowchart of a method 500 of determining an alternate route for the vehicle 10 at 212, according to an embodiment. Processor 110 receives the planned route and the route status data as shown and described in 206 and 208, respectively, in FIG. 2. At 502, necessary stops are determined using processor 110. At 504, the necessary stops in areas requiring stored energy are identified using processor 110. At 506, an alternate route is determined making all necessary stops. At 508, the energy consumption of the alternate route is determined using processor 110. At 510, it is determined, using processor 110, whether energy consumption allows the alternate route to be completed. In an embodiment, when the energy consumption for the alternate route still exceeds the energy level, the process may return to 506 to determine another alternate route. When it is determined that the energy consumption of the alternate route allows it to be completed, the alternate route may be presented to a user, for example by inclusion in the notification provided to the user at 216 in the method 200 shown in FIG. 2.

At 502, the processor 110 determines the necessary stops. In an embodiment, all stops included in the planned route are treated as necessary. In an embodiment, the necessary stops may be determined based on, for example, flags or identifiers associated with each of the stops in the planned route. The method 500 then proceeds to 502.

At 504, the processor 110 identifies the necessary stops in areas requiring stored energy. In an embodiment, all stops included in the planned route are treated as necessary stops. In an embodiment, the stops included in the planned route are all included as necessary stops. In an embodiment, the planned route includes data for each stop identifying necessary stops. In an embodiment, the planned route includes data prioritizing each stop, and necessary stops are identified based on the prioritization data. In an embodiment, the prioritization data is compared to a threshold priority value to determine whether the stop is a necessary stop. In an embodiment, the threshold value for priority is made more restrictive in each successive iteration of 212 performed by the processor 110. In an embodiment, necessary stops may be determined based on the availability of charging at the particular stop. In an embodiment, the prioritization data may include whether charging facilities, such as a shore power connection, are available at the stop. The inclusion of charging facilities in the prioritization data may be included as a factor when generating the prioritization data. The method 500 then proceeds to 506.

At 506, processor 110 determines an alternate route that includes all necessary stops 506. The alternate route includes route segments among all of the necessary stops determined by processor 110 at 502. At 506, processor 110 may determine the alternate route based on the route status data received by processor 110 at 206. In an embodiment, processor 110 can determine the alternate route by identifying and selecting route segments within a region requiring the transport climate control system 102 to be powered by the energy storage device 106 that have less traffic than the planned route, to shorten the amount of time the transport climate control system 102 is powered by energy storage device 106. In an embodiment, the alternate route determined by processor 110 may include fewer stops and thus require less energy to be completed. In an embodiment, the alternate route is determined by processor 110 identifying and selecting route segments expected to have ambient temperatures, cloud cover, and/or solar intensity conditions that would reduce energy consumption by the transport climate control system 102 when it is powered by the energy storage device 106. In an embodiment, the alternate route may adjust the order of stops to perform all stops outside of dense urban areas first, for example to maximize the power harvested by solar panels 118. In an embodiment, the processor 110 can determine the alternate route by identifying and selecting route segments that reduce the amount of time the transport climate control system must be powered by the energy storage device or that increase the amount of time the transport climate control system is powered by prime mover 122 and/or during which the energy storage device 106 may be charged by alternator 124. In an embodiment, off-board processing at a processor connected to or in communication with remote device 114 may be used to determine the alternate route. The route segments are combined into a route among all of the necessary stops identified at 504. The method 500 then proceeds to 508.

At 508, processor 110 is used to determine energy consumption of the alternate route. Processor 110 may determine the energy consumption of the alternate route by applying the method of determining of energy consumption described at 406 above to the alternate route determined at 506. The alternate route determined at 506 may be combined with the route status data received by processor 110 at 208 to determine the location and duration of when the transport climate control system 102 is powered by the energy storage device 106. The route status data may further be used to provide information on ambient conditions during the alternate route. The ambient conditions may include, for example, temperature and cloud cover or solar intensity. The ambient conditions corresponding to the time and location of the transport climate control system 102 when it is being powered solely by the energy storage device 106 may be used to determine the energy consumption of the transport climate control system 102 during the alternate route. In an embodiment using such a mode, the total energy consumption can be an integral over time of the energy consumption based on the ambient conditions at particular points in time for the alternate route. The method 500 then proceeds to 510.

At 510, processor 110 determines whether the energy consumption determined at 508 allows the alternate route to be completed. The energy consumption determined at 508 is compared to the energy level determined by processor 110 at 204. When the energy consumption of the alternate route is less than the energy level (i.e., the alternate route can be completed), the method may proceed to 216 by providing the notification to the user via display 112 or remote device 114, as described above and shown in FIG. 2. The notification presented at 216 may include the alternate route, and may further include a prompt for user input accepting or rejecting the alternate route.

In an embodiment including a prompt for user input, at 218, user input may be received accepting or rejecting the alternate route, for example via a user interface device such as a touchscreen, keyboard, microphone, etc. included in display 112 and/or remote device 114. In this embodiment, at 218 when the received user input accepts the alternate route, the method 200 described above and shown in FIG. 2 proceeds to 220 where the alternate route is implemented by changing a route provided to the driver of the vehicle from the planned route to the alternate route.

In an embodiment, when the energy consumption exceeds the energy level (i.e., the alternate route cannot be completed), the method 200, 500 iterates. In an embodiment, when the method 200, 500 iterates, it can do so by returning to 506 where the processor determines an alternate route 506. In an embodiment, when the process iterates, it does so by returning to 502, where the processor determines necessary stops 502. In an embodiment, when the process iterates by returning to 502, a threshold value for determining necessary stops is made more restrictive. In an embodiment, when the energy consumption of the alternate route exceeds the energy level, the method 200 described above and shown in FIG. 2 proceeds to 216, where the notification is presented to the user via display 112 and/or remote device 114, and the notification does not include an alternate route. In an embodiment, the alternate route may be provided to a user outside the vehicle 10, for example a user of remote device 114 when remote device 114 is a remote server, and the user outside vehicle 10 may direct the alternate route to be provided to a user in vehicle 10 (i.e. the driver), for example via phone call or manual entry of the alternate route into a dispatching or notification system.

FIG. 6 shows a flowchart of a method 500 of determining operational adjustments to operation of the transport climate control system 102 at 214, according to an embodiment. In the embodiment shown in FIG. 6, at 602, processor 110 receives cargo data. At 610, processor 110 receives the determined energy level. At 604, processor 110 determines an allowable set point adjustment. At 606, adjusted set point values are determined by processor 110. At 608, processor 110 determines a predicted updated energy consumption. At 612, the processor 110 determines whether the predicted updated energy consumption allows the route to be completed 612. In an embodiment, when it is determined that the updated energy consumption does not allow the route to be completed, the process may iterate by returning to 606, where processor 110 determines another adjusted set point.

At 602, processor 110 receives cargo data. The cargo data may be stored in a memory, or provided to processor 110 via remote device 114 via communication link 116. The cargo data may include, for example, identification and/or classification of the goods carried in the transport unit 100. An identification of the goods may be a particular identifier such as the type of goods, such as the particular kind of fruit or vegetable included in the cargo. A classification of the goods may be an indication of the category of goods being carried, such as meats, produce, or the like. In an embodiment, a lookup table correlating identifications or classifications of goods with preferred and/or permissible temperatures is stored in a memory coupled to processor 110. This lookup table may be used to identify the preferred and/or permissible temperatures for the goods in transport unit 100, based on the cargo data received at 602. In an embodiment, the cargo data received at 602 includes the preferred and/or permissible temperatures for those goods during transit. In an embodiment, the preferred and/or permissible temperatures for the goods may be data that is manually entered into the system, for example at the time of loading. In an embodiment, a user input at display 112, such as a touchscreen included in display 112 may be used to enter the preferred and/or permissible temperatures for the goods. In an embodiment, remote device 114 may be used to enter the preferred and/or permissible temperatures for the goods. In an embodiment, display 112 and/or remote device 114 may prompt a user for the input of preferred and/or permissible temperatures for the goods, for example when a route is started. The method 600 then proceeds to 604.

At 604, processor 110 determines an allowable set point adjustment. The allowable set point adjustment is the a deviation from the current temperature set points of the transport climate control system 102 that remains within the preferred and/or permissible temperatures obtained in or based on the cargo data received by the processor 110 at 602. In an embodiment, the allowable set point adjustment can be the maximum permissible deviation from the current temperature set points based on the permissible temperatures for the goods. The method 600 then proceeds to 606.

At 606, processor 110 determines adjusted set point values for transport climate control system 102. The adjusted set point values are values between the current temperature set points of the transport climate control system 102 and the allowable set point adjustment determined at 604. In an embodiment, the amount of deviation is determined based on the difference between the energy level and the predicted amount of energy needed to complete the route, with larger differences resulting in an adjusted set point closer to the allowable set point adjustment, and smaller differences resulting in an adjusted set point values closer to the current temperature set points. The classification of differences can be based on, for example, a predetermined lookup table of the differences between the energy level and the predicted amount of energy to complete the route, simulation data, etc. In an embodiment, the adjusted set point can be the allowable set point adjustment determined at 604. In an embodiment, the adjusted set point can be a set of predetermined set point adjustments that is within the allowable set point adjustment determined at 604. The method 600 then proceeds to 608.

At 608, processor 110 determines a predicted updated energy consumption for transport climate control system 102 when the adjusted set point values determined at 606 are adopted. The predicted updated energy consumption may be determined by processor 110 by conducting the determination of energy consumption as described in 406, but using an alternative model for energy consumption that is reflective of the adjusted set point values determined at 606. In an embodiment, the alternative model for energy consumption is a second function or predetermined lookup table for energy consumption based on ambient conditions for a second group of temperature set points for the transport climate control system 102. The method 600 then proceeds to 612.

At 610, processor 110 receives the determined energy level. The determined energy level received by processor 110 at 610 is the energy level determined at 204 in the method 200 shown in FIG. 2. In an embodiment, the energy level is determined according to the embodiment of 204 shown in FIG. 3. The method 600 then proceeds to 612.

At 612, the processor 110 determines whether the predicted updated energy consumption allows the route to be completed. The predicted updated energy consumption determined at 608 is compared to the energy level received at 610. In an embodiment, when it is determined that the updated energy consumption does not allow the route to be completed, the process may iterate by returning to 606, where processor 110 determines another adjusted set point 606. When processor 110 determines that the updated energy consumption allows the route to be completed at 612, the adjusted set point values are provided to the user, for example as part of the notification provided at 216 of method 200 described above and shown in FIG. 2. In an embodiment, at 218 of method 200 described above and shown in FIG. 2, user input is received. The user input may be, for example, an acceptance or rejection of the adjusted set point values determined at 608 and that are determined at 612 to allow the route to be completed. In an embodiment, when the user input is an acceptance of the adjusted set point values, method 200 proceeds to 220 to implement the operational adjustment by using the adjusted set point values to govern the operation of the transport climate control system 102.

Aspects:

It is understood that any of aspects 1-14 may be combined with any of aspects 15-20.

Aspect 1. A method of operating a transport climate control system of a vehicle, comprising:
while the vehicle is in transit, obtaining a state of charge of an energy storage device capable of providing power to the transport climate control system;
determining an energy level including the state of charge;
receiving a planned route for the vehicle;
receiving route status data associated with the planned route for the vehicle, wherein the route status data comprises at least one of traffic data, weather data, and geographic data identifying areas where the transport climate control system is to be solely powered by the energy storage device;
determining, using a processor, whether the energy level is sufficient to complete the planned route for the vehicle based on the planned route and the route data; and
when the energy level is not sufficient to complete the planned route for the vehicle, providing a notification to a user via a display.

Aspect 2. The method according to aspect 1, wherein the planned route comprises at least one segment where the transport climate control system is powered by a prime mover and at least one segment where the transport climate control system is powered solely by the energy storage device.

Aspect 3. The method according to any of aspects 1-2, wherein the energy storage device is a battery of the transport climate control system.

Aspect 4. The method according to any of aspects 1-3, wherein the energy storage device is a battery of the vehicle.

Aspect 5. The method according to any of aspects 1-4, wherein the energy level further includes a predicted quantity of harvested energy.

Aspect 6. The method according to aspect 5, wherein the predicted quantity of harvested energy is predicted based on the route status data.

Aspect 7. The method according to any of aspects 5-6, wherein the harvested energy includes energy from solar collection.

Aspect 8. The method according to any of aspects 5-7, wherein the harvested energy includes energy from regenerative braking.

Aspect 9. The method according to any of aspects 1-8, wherein the display is located on the vehicle.

Aspect 10. The method according to any of aspects 1-8, wherein the display is separate from the vehicle.

Aspect 11. The method according to any of aspects 1-10, further comprising determining a predicted run time for the transport climate control system based on the energy level, the planned route, and the route data, and presenting the predicted run time to the user via the display.

Aspect 12. The method according to any of aspects 1-11, further comprising determining, using the processor, an alternate route based on map data, the energy level, and the route status data, and wherein the notification includes the alternate route.

Aspect 13. The method according to any of aspects 1-12, further comprising determining, using the processor, adjusted set point parameters for the transport climate control system that are capable of completing the planned route for the vehicle based on cargo data for the vehicle, the planned route, the route status data, and the energy level, and wherein the notification includes the adjusted set point parameters.

Aspect 14. The method according to aspect 13, further comprising receiving a user input accepting or rejecting the adjusted set point parameters, and when a user input accepting the adjusted set point parameters is received, operating the transport climate control system according to the adjusted set point parameters.

Aspect 15. A transport climate control system for use in a vehicle, comprising:
a refrigeration circuit including a compressor configured to be powered an energy storage device;
a power meter, configured to measure a state of charge of the energy storage device;
a display; and
a processor, configured to:
receive an energy level including the state of charge of the energy storage device;
receive a planned route for the vehicle;
receive route status data associated with the planned route for the vehicle, wherein the route status data comprises at least one of traffic data, weather data, and geographic data identifying areas where the transport climate control system is to be solely powered by the energy storage device; and
determine whether the energy level is sufficient to complete the planned route for the vehicle based on the planned route and the route data; and direct the display to provide a notification when the energy level is not sufficient to complete the planned route for the vehicle.

Aspect 16. The transport climate control system according to aspect 15, further comprising a prime mover configured to drive an alternator, wherein the alternator charges the energy storage device.

Aspect 17. The transport climate control system according to any of aspects 15-16, further comprising a power harvesting device including at least one of a solar cell or a regenerative braking device, and wherein the processor is further configured to determine a predicted quantity of harvested energy from the power harvesting device, and the energy level further includes the predicted quantity of harvested energy.

Aspect 18. The transport climate control system according to any of aspects 15-17, wherein the processor is further configured to determine an alternate route based on map data, the energy level, and the route status data, and the notification includes the alternate route.

Aspect 19. The transport climate control system according to any of aspects 15-18, wherein the processor is configured to determine adjusted set point parameters for the transport climate control system that are capable of completing the planned route for the vehicle based on cargo data for the vehicle, the planned route, the route status data, and the energy level, and the notification includes the adjusted set point parameters.

Aspect 20. The transport climate control system according to aspect 19, further comprising a user input device configured to receive an input accepting or rejecting the adjusted set point parameters, and wherein the transport climate control system is operated according to the adjusted set point parameters when the input accepting the adjusted set point parameters is received.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of operating a transport climate control system of a vehicle, comprising:
    while the vehicle is in transit, obtaining a state of charge of an energy storage device capable of providing power to the transport climate control system;
    receiving a planned route for the vehicle;
    receiving route status data associated with the planned route for the vehicle, wherein the route status data comprises at least one of traffic data, weather data, and geographic data identifying areas where the transport climate control system is to be solely powered by the energy storage device;
    determining a predicted charging of the energy storage device by an alternator configured to be driven by a prime mover based on the planned route and the route status data;
    determining an energy level including the state of charge and the predicted charging;
    determining whether the energy level is sufficient to complete the planned route for the vehicle based on the planned route and the route status data; and
    when the energy level is not sufficient to complete the planned route for the vehicle, providing a notification to a user via a display.

2. The method of claim 1, wherein the planned route comprises at least one segment where the transport climate control system is powered by the prime mover and at least one segment where the transport climate control system is powered solely by the energy storage device.

3. The method of claim 1, wherein the energy storage device is a battery of the transport climate control system.

4. The method of claim 1, wherein the energy storage device is a battery of the vehicle.

5. The method of claim 1, wherein the energy level further includes a predicted quantity of harvested energy.

6. The method of claim 5, wherein the predicted quantity of harvested energy is predicted based on the route status data.

7. The method of claim 5, wherein the harvested energy includes energy from solar collection.

8. The method of claim 5, wherein the harvested energy includes energy from regenerative braking.

9. The method of claim 1, wherein the display is located on the vehicle.

10. The method of claim 1, wherein the display is separate from the vehicle.

11. The method of claim 1, further comprising determining a predicted run time for the transport climate control system based on the energy level, the planned route, and the route data, and presenting the predicted run time to the user via the display.

12. The method of claim 1, further comprising determining, using the processor, an alternate route based on map data, the energy level, and the route status data, and wherein the notification includes the alternate route.

13. The method of claim 1, further comprising determining, using the processor, adjusted set point parameters for the transport climate control system that enable the vehicle to complete the planned route based on cargo data for the vehicle, the planned route, the route status data, and the energy level, and wherein the notification includes the adjusted set point parameters.

14. The method of claim 13, further comprising receiving a user input accepting or rejecting the adjusted set point parameters, and when the user input accepting the adjusted set point parameters is received, operating the transport climate control system according to the adjusted set point parameters.

15. The method of claim 1, wherein the route status data comprises geographic data identifying areas where the transport climate control system is to be solely powered by the energy storage device.

16. A transport climate control system for use in a vehicle, comprising:
    a refrigeration circuit including a compressor configured to be powered by an energy storage device;
    an alternator configured to be driven by a prime mover, wherein the alternator is configured to charge the energy storage device;
    a power meter, configured to measure a state of charge of the energy storage device;
    a display; and
    a processor, configured to:
        receive a state of charge of the energy storage device;
        receive a planned route for the vehicle;
        receive route status data associated with the planned route for the vehicle, wherein the route status data comprises at least one of traffic data, weather data, and geographic data identifying areas where the transport climate control system is to be solely powered by the energy storage device; and determine a predicted charging of the energy storage device by the alternator based on the planned route and the route status data;

determine an energy level including the state of charge and the predicted charging;

determine whether the energy level is sufficient to complete the planned route for the vehicle based on the planned route and the route status data; and direct the display to provide a notification when the energy level is not sufficient to complete the planned route for the vehicle.

17. The transport climate control system of claim 16, further comprising a power harvesting device including at least one of a solar cell or a regenerative braking device, and wherein the processor is further configured to determine a predicted quantity of harvested energy from the power harvesting device, and the energy level further includes the predicted quantity of harvested energy.

18. The transport climate control system of claim 16, wherein the processor is further configured to determine an alternate route based on map data, the energy level, and the route status data, and the notification includes the alternate route.

19. The transport climate control system of claim 16, wherein the processor is configured to determine adjusted set point parameters for the transport climate control system that enable the vehicle to complete the planned route for the vehicle based on cargo data for the vehicle, the planned route, the route status data, and the energy level, and the notification includes the adjusted set point parameters.

20. The transport climate control system of claim 19, further comprising a user input device configured to receive an input accepting or rejecting the adjusted set point parameters, and wherein the transport climate control system is operated according to the adjusted set point parameters when the input accepting the adjusted set point parameters is received.

21. The transport climate control system of claim 19, wherein the route status data comprises geographic data identifying areas where the transport climate control system is to be solely powered by the energy storage device.

* * * * *